(12) United States Patent
Chikazawa

(10) Patent No.: US 9,350,933 B2
(45) Date of Patent: May 24, 2016

(54) DISPLAY APPARATUS AND TELEVISION RECEIVER

(71) Applicant: SHARP KABUSHIKI KAISHA, Osaka-shi, Osaka (JP)

(72) Inventor: Hideyuki Chikazawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/409,983

(22) PCT Filed: Jun. 20, 2013

(86) PCT No.: PCT/JP2013/066906
§ 371 (c)(1),
(2) Date: Dec. 19, 2014

(87) PCT Pub. No.: WO2013/191231
PCT Pub. Date: Dec. 27, 2013

(65) Prior Publication Data
US 2015/0341587 A1    Nov. 26, 2015

(30) Foreign Application Priority Data

Jun. 22, 2012  (JP) ................................. 2012-141232

(51) Int. Cl.
| | |
|---|---|
| *H04N 3/14* | (2006.01) |
| *H04N 5/64* | (2006.01) |
| *H04N 5/44* | (2011.01) |
| *F21V 8/00* | (2006.01) |

(52) U.S. Cl.
CPC .................. *H04N 5/64* (2013.01); *G02B 6/005* (2013.01); *G02B 6/0088* (2013.01); *G02B 6/0091* (2013.01); *H04N 5/44* (2013.01); *G02B 6/0031* (2013.01); *G02B 6/0085* (2013.01)

(58) Field of Classification Search
CPC ... G02B 6/0088; G02B 6/0091; G02B 6/0085
See application file for complete search history.

(56) References Cited

U.S. PATENT DOCUMENTS

| | | |
|---|---|---|
| 2001/0022494 A1 | 9/2001 | Fujishiro |
| 2001/0035923 A1 | 11/2001 | Cha et al. |
| 2010/0302717 A1 | 12/2010 | Oh et al. |

(Continued)

FOREIGN PATENT DOCUMENTS

| | | |
|---|---|---|
| JP | 2000-29004 A | 1/2000 |
| JP | 2001-265235 A | 9/2001 |
| JP | 2001-356343 A | 12/2001 |

(Continued)

*Primary Examiner* — Jefferey Harold
*Assistant Examiner* — Humam Satti
(74) *Attorney, Agent, or Firm* — Birch, Stewart, Kolasch & Birch, LLP

(57) ABSTRACT

A display apparatus, comprising: a display panel including a display region displaying an image in front side at a center part of the display panel, and including a non-display region around the display region; a light guide plate arranged in rear side of the display panel, and being opposed to the display panel; an optical sheet arranged between the light guide plate and the display panel; and a support part arranged between the optical sheet and the light guide plate, and supporting an edge part of the optical sheet, wherein the optical sheet is opposed to the display region and the non-display region, and at least a part of the support part is located in the display region over a boundary between the non-display region and the display region.

2 Claims, 4 Drawing Sheets

(56) References Cited

U.S. PATENT DOCUMENTS

2012/0257417 A1* 10/2012 Lee et al. ............... 362/622
2013/0107157 A1* 5/2013 Yang et al. ............... 349/58

FOREIGN PATENT DOCUMENTS

| | | |
|---|---|---|
| JP | 2010-170138 A | 8/2010 |
| JP | 2011-170275 A | 9/2011 |

* cited by examiner

DISPLAY APPARATUS AND TELEVISION RECEIVER

CROSS-REFERENCE TO RELATED APPLICATIONS

This application is the National Phase of PCT/JP2013/066906 filed on Jun. 20, 2013, which claims priority under 35 U.S.C. 119(a) to Patent Application No. 2012-141232 filed in Japan on Jun. 22, 2012, all of which are hereby expressly incorporated by reference into the present application.

FIELD

The present invention relates to a display apparatus and a television receiver, on which an image is displayed by emitting light from a light source to a display panel through a light guide plate.

BACKGROUND AND SUMMARY

A thin display apparatus (liquid-crystal display apparatus, for example), which occupies a rather small area in a room for the size of its display screen, has widely been spread in general, as such a display apparatus makes it possible to effectively utilize a limited space in a room. A liquid crystal display apparatus is configured to display an image by emitting light from a light source to a liquid-crystal display panel on which the image is displayed. In recent years, in order to reduce power consumption, an LED (Light Emitting Diode) is adopted for the light source, and a light guide plate is arranged in rear side of the display panel while the LED is opposed to the circumferential surface of the light guide plate, to supply light to the display panel. Between the light guide plate and the display panel, an optical sheet diffusing and condensing light is placed.

A mold frame is arranged to surround the display panel, and the display panel is supported by the mold frame. The mold frame has a protrusion slightly protruding inward between the optical sheet and the light guide plate, and the optical sheet is supported by the protrusion. While the display panel has a display region on which an image is displayed in a middle part thereof and a non-display region around the display region, the protrusion only protrudes to a position opposed to the non-display region.

It is desirable to block transfer of heat from a light source, since an optical sheet expands and contracts due to heat. Though the display apparatus suppresses transfer of heat from the light source by the protrusion, the protruding end of the protrusion stops at a position opposed to the non-display region, resulting in insufficient blocking of heat.

An example embodiment has been made in view of the circumstances described above, and has an object to provide a display apparatus and a television receiver, which ensure that heat transfer from a light source to an optical sheet is blocked.

A display apparatus according to the example embodiment, comprising: a display panel including a display region displaying an image in front side at a center of the display panel, and including a non-display region around the display region; a light guide plate arranged in rear side of the display panel and being opposed to the display panel; an optical sheet arranged between the light guide plate and the display panel; and a support part arranged between the optical sheet and the light guide plate and supporting an edge part of the optical sheet, is characterized in that the optical sheet is opposed to the display region and the non-display region, and at least a part of the support part is located in the display region over a boundary between the non-display region and the display region.

According to the example embodiment, the support part for supporting the optical sheet is present not only in a non-display region but also in a position opposite to a display region, thereby ensuring that heat transfer from the light source is blocked.

The display apparatus according to the example embodiment is characterized in that a light passing portion through which light passes is provided at a portion of the support part which is opposed to the display region.

According to the example embodiment, a portion opposite to the display region at the support part is provided with a light passing portion, which can ensure emission of light to the display region, prevent the display panel from having lowered luminance, and maintain the quality of display.

The display apparatus according to the example embodiment is characterized in that the light passing portion is a hole or a cutout.

According to the example embodiment, a hole or a cutout serves as the light passing portion, which realizes emission of light to the display panel.

The display apparatus according to the example embodiment is characterized in that the light passing portion is formed with a transparent or translucent member.

According to the example embodiment, the light passing portion is formed with a transparent or translucent member, which realizes emission of light to the display panel.

A television receiver according to the example embodiment is characterized by including: the display apparatus according to any of the ones as described above; and a reception part receiving television broadcast, and is characterized in that an image is displayed on the display apparatus based on the television broadcast received by the reception part.

According to the example embodiment, it is possible to produce effects similar to those of the display apparatus as described above.

According to the example embodiment, the support part for supporting the optical sheet is present not only in the non-display region but also in a position opposed to the display region, thereby ensuring that heat transfer from the light source is blocked.

DETAILED DESCRIPTION OF NON-LIMITING EXAMPLE EMBODIMENTS

Embodiment 1

Figure 1:
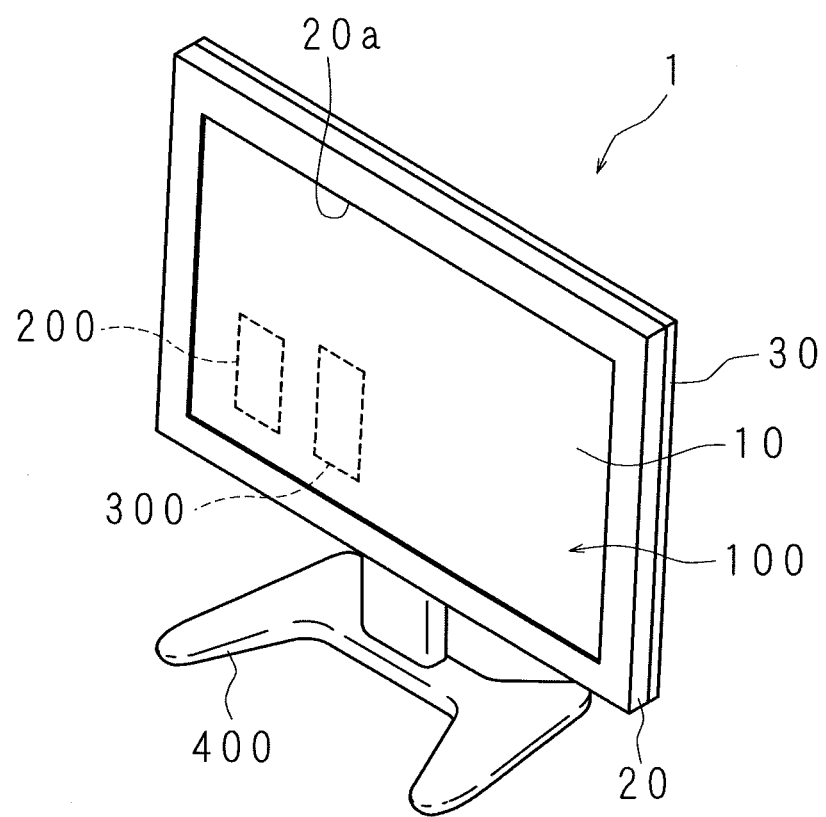
FIG. 1 is a perspective view schematically illustrating a television receiver according to Embodiment 1.

The example embodiment will be described below with reference to the drawings illustrating a television receiver according to Embodiment 1. FIG. 1 is a perspective view schematically illustrating the television receiver.

In the drawings, the reference numeral 1 denotes a television receiver. The television receiver 1 includes a display apparatus 100 on which an image is displayed, a tuner 200

(reception part) receiving broadcast wave from an antenna (not illustrated), and a decoder 300, located in the display apparatus 100, for decoding coded broadcast wave. The television receiver 1 decodes the broadcast wave received at the tuner 200 by the decoder 300, and displays an image on the display apparatus 100 based on the decoded information. It is noted that the tuner 200 and the decoder 300 may also be provided outside the display apparatus 100 and be connected to the display apparatus 100. A stand 400 for supporting the television receiver 1 is provided below the television receiver 1.

The display apparatus 100 includes a rectangular display panel 10 having liquid crystal, and the display panel 10 is configured to control the voltage applied to the liquid crystal to adjust the light transmission rate. The display panel 10 is put in a vertical orientation in a front cabinet 20 and a rear cabinet 30. The front cabinet 20 and the rear cabinet 30 are located at front and back, respectively, of the display panel 10. The front cabinet 20 forms a shape of a rectangular frame, having a rectangular opening 20a at a middle part thereof. The front cabinet 20 is made of, for example, an aluminum member. The rear cabinet 30 has a shape of a rectangular tray with the front side thereof opened, and is made of, for example, an electro-galvanized steel sheet. The front cabinet 20 and back cabinet 30 being formed with metal realize efficient heat release, and reduce the difference in heat expansion coefficients between the cabinets 20 and 30 while preventing occurrence of deformation. It is noted that the front cabinet 20 and back cabinet 30 may alternatively be formed with a resin member.

The front cabinet 20 and the back cabinet 30 have substantially the same vertical and horizontal length, while the circumferential parts thereof being opposed to each other. The vertical and horizontal length of the display panel 10 are somewhat larger than those of the opening 20a, while the circumferential part of the display panel 10 is opposed to the inner edge part of the front cabinet 20.

Figure 2:
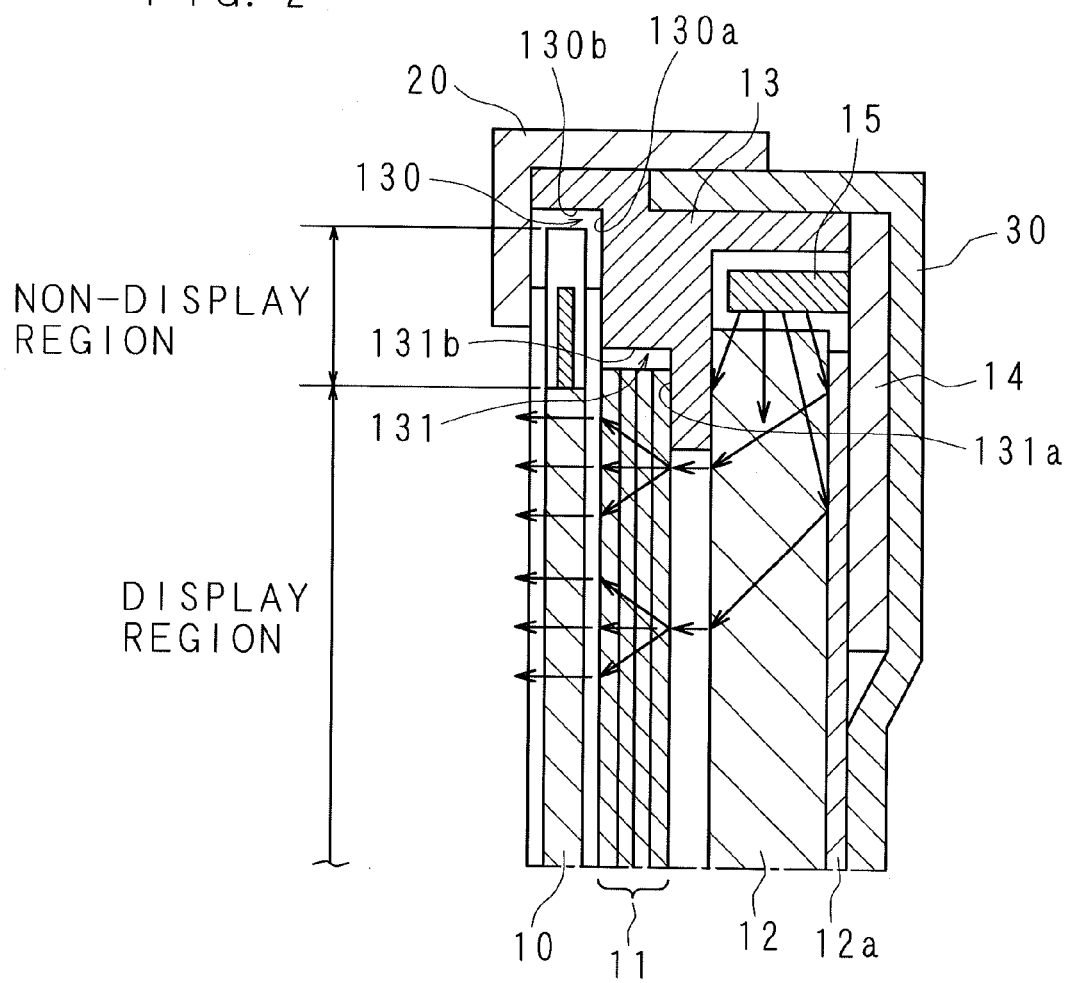
FIG. 2 is a vertical section view schematically illustrating a part of the television receiver.

FIG. 2 is a vertical section view schematically illustrating a part of the television receiver 1.

As illustrated in FIG. 2, the display panel 10 has a display region displaying an image at a middle part thereof, and has a non-display region on which no image is displayed at the circumference of the display region (outer circumferential edge of the display panel 10). A rectangular frame-shaped support 13 is provided at the inner circumferential parts of the front cabinet 20 and the back cabinet 30. The support part 13 includes a panel support groove 130 having an L-shaped cross section in front side and supporting the display panel 10. The panel support groove 130 has an opposite surface part 130a opposed to the front cabinet 20 and a side surface part 130b which is located at the outer circumferential edge of the support part 13 and is perpendicular to the opposite surface part 130a. The non-display region of the display panel 10 is held between the opposite surface part 130a and the front cabinet 20.

The support part 13 includes a sheet support groove 131 having an L-shaped cross section in rear side and supporting an optical sheet 11, which will be described later. The sheet support groove 131 has an opposite surface part 131a opposed to the display region and non-display region of the display panel 10, and a side surface part 131b which is located at the outer circumferential edge of the support part 13 and is perpendicular to the opposite surface part 131a. The opposite surface part 131a is arranged along a boundary part over the display region and the non-display region. Multiple optical sheets 11 for diffusing and condensing light are provided between the display panel 10 and the opposite surface part 131a, and the edge part of the optical sheet 11 is supported by the opposite surface part 131a.

A light guide plate 12 is provided in rear side of the opposite surface part 131a, and the front surface of the light guide plate 12 is opposed to the optical sheet 11. The light guide plate 12 has a reflection sheet 12a at the back surface part thereof, which reflects light toward the front surface. An LED substrate 14 is provided in rear side of the edge portion of the light guide plate 12. The LED substrate 14 protrudes to the side outer than the light guide plate 12, and an LED 15 is mounted on the front surface of the protruding portion. The LED 15 is opposed to the circumferential surface of the light guide plate 12. The light guide plate 12 and the LED substrate 14 are supported between the rear cabinet 30 and the opposite surface part 131a.

The light generated from the LED 15 enters the light guide plate 12, is reflected and emitted from the front surface of the light guide plate 12. The light emitted from the light guide plate 12 is diffused by the optical sheet 11, and enters the display panel 10. As indicated by the arrows in FIG. 2, in the vicinity of the opposite surface part 131a, the light diffused by the optical sheet 11 proceeds to a position opposed to the front surface of the opposite surface part 131a, and enters the display panel 10. This can prevent the luminance from being lowered in the display region opposed to the opposite surface part 131a, which thus maintains the display quality.

In the television receiver 1 according to Embodiment 1, the opposite surface part 131a for supporting the optical sheet 11 is present not only in the non-display region but also in the position opposed to the display region, making it possible to ensure blocking of heat transfer from the LED 15 to the optical sheet 11.

Embodiment 2

Figure 3:
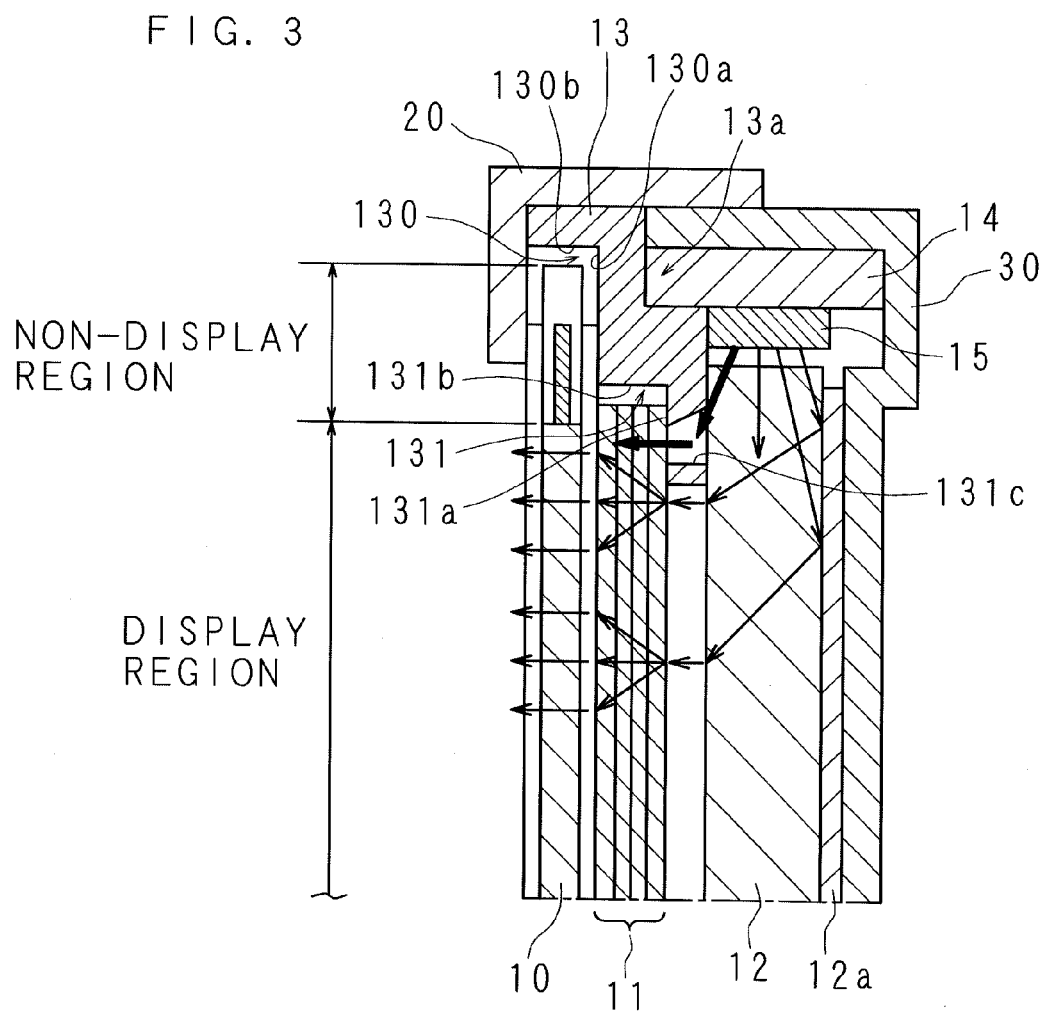
FIG. 3 is a vertical section view schematically illustrating a part of a television receiver according to Embodiment 2.

The example embodiment will now be described below with reference to the drawings illustrating a television receiver 1 according to Embodiment 2. FIG. 3 is a vertical section view schematically illustrating a part of the television receiver 1.

The support part 13 includes an insertion groove 13a into which an LED substrate 14 is inserted, at a portion opposed to a side surface of the back cabinet 30. The insertion groove 13a is recessed to the front side, while the front surface portion of the LED substrate 14 is inserted into the insertion groove 13a so as to be opposed to the side surface of the light guide plate 12. An LED 15 is mounted on a surface of the LED substrate 14, which is opposed to the light guide plate 12.

The opposite surface part 131a has a through hole 131c penetrating in the direction of the front-back surfaces at the boundary between the display region and the non-display region. The through hole 131c is configured to have a larger diameter in rear side and a smaller diameter in front side. The through hole 131c is arranged closer to the display region, and the entire opening in front side of the through hole 131c is located to face the display region. Thus, the light emitted from the light guide plate 12 and passing the through hole 131c is focused toward the display region and enters the display panel 10. The focused light enters the display region opposed to the opposite surface part 131a, which can surely prevent the luminance from being lowered and thus can maintain the display quality. It is noted that a cutout may alternatively be provided instead of the through hole 131c such that light passes through the cutout. The cutout may also have a diameter smaller in front side than that in rear side, and may be so designed that the entire opening in front side faces the display region.

The configuration parts of the television receiver 1 according to Embodiment 2 which is similar to those in Embodiment 1 are denoted by the same reference codes and will not be described in detail.

Embodiment 3

Figure 4:
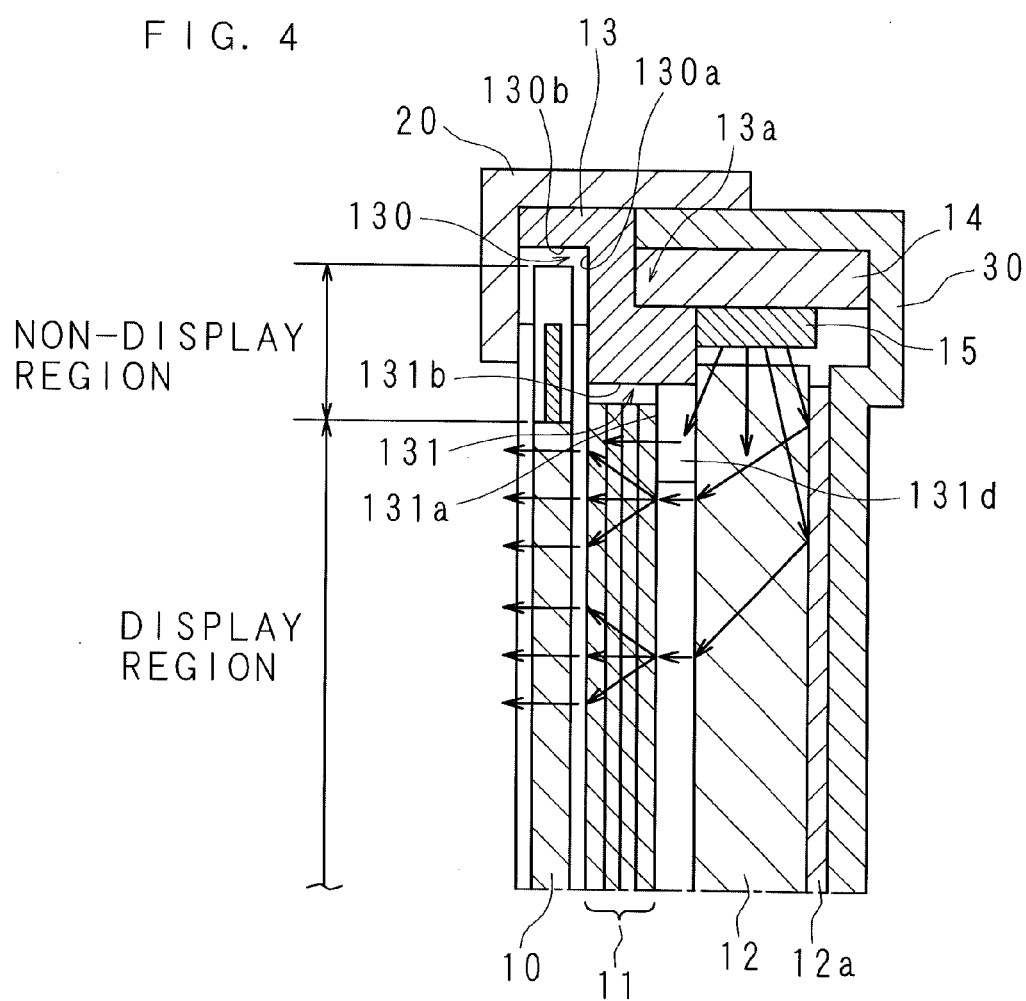
FIG. 4 is a vertical section view schematically illustrating a part of a television receiver according to Embodiment 3.

The example embodiment will now be described below with reference to the drawings illustrating a television receiver 1 according to Embodiment 3. FIG. 4 is a vertical section view schematically illustrating a part of the television receiver 1. A part or whole of an opposite surface part 131*a* is made of a transparent or translucent member 131*d*, which is arranged at a position opposed to the display region. It is noted that, in the support part 13, a part other than the transparent or translucent member 131*d* is made of a opaque member, that is, the support part 13 is configured by two-color molding of the transparent or translucent member 131*d* and a opaque member. The light emitted from the light guide plate 12 enters the opposite surface part 131*a* and is possible to pass through. The light passing through the opposite surface part 131*a* enters the display region of the display panel 10. In the display region opposed to the opposite surface part 131*a*, lowering in the luminance can surely be prevented while the display quality can be maintained.

The configuration parts of the television receiver 1 according to Embodiment 3 similar to those in Embodiment 1 or 2 are denoted by the same reference codes and will not be described in detail.

The embodiments disclosed herein are to be regarded as illustrative and not restrictive in all respects. The scope of the example embodiment is intended to embrace all changes that fall within metes and bounds of the claims, or equivalence of such metes and bounds thereof.

What is claimed is:

1. A display apparatus, comprising:
    a display panel including a display region displaying an image in front side at a center part of the display panel, and including a non-display region around the display region;
    a light guide plate arranged in rear side of the display panel, and being opposed to the display panel;
    an optical sheet arranged between the light guide plate and the display panel; and
    a support part arranged between the optical sheet and the light guide plate, and supporting an edge part of the optical sheet,
    wherein the optical sheet is opposed to the display region and the non-display region, and
    at least a part of the support part is located in the display region over a boundary between the non-display region and the display region, and
    a hole or a cutout is provided at a portion of the support part that is opposed to the display region.

2. A television receiver, comprising:
    the display apparatus according to claim 1; and
    a reception part receiving television broadcast,
    wherein an image is displayed on the display apparatus based on the television broadcast received by the reception part.

\* \* \* \* \*